N. S. Thompson.
Animal-Trap.
N° 73475. Patented Jan. 21, 1868.
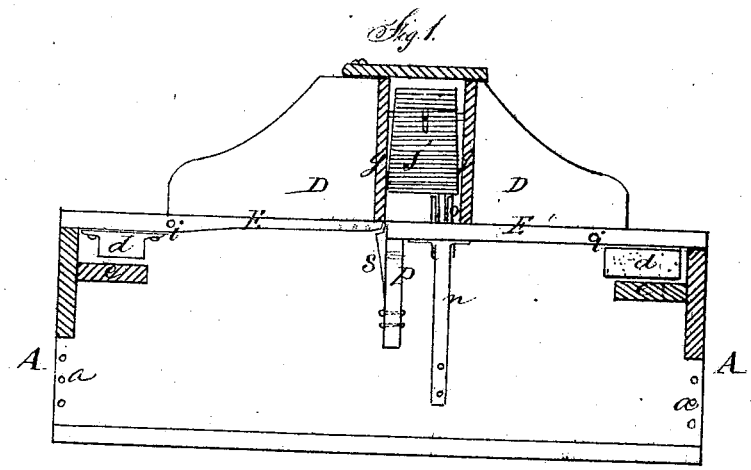
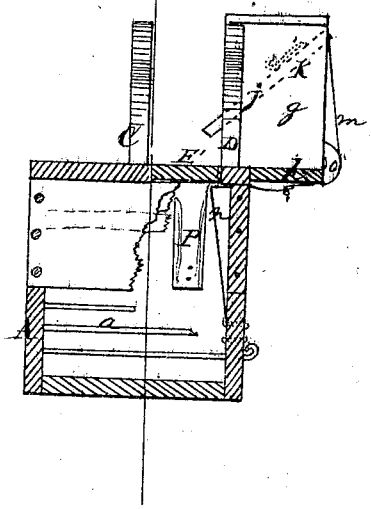

United States Patent Office.

NELSON S. THOMPSON, OF GERMANTOWN, OHIO.

Letters Patent No. 73,475, dated January 21, 1868.

---

ANIMAL-TRAP.

---

The Schedule referred to in these Letters Patent and making part of the same.

---

TO ALL WHOM IT MAY CONCERN:

Be it known that I, NELSON S. THOMPSON, of Germantown, in Montgomery county, in the State of Ohio, have invented a new and useful Improvement in Traps for Catching Rats or other Animals; and I do hereby declare that the following is a full and exact description thereof, reference being had to the accompanying drawings, and to the letters of reference marked thereon.

Figure 1 is a longitudinal vertical section of my trap.

Figure 2 represents a transverse vertical section of the same, and the line $x\ x$ indicates the division at which fig. 1 is taken.

A denotes a rectangular box, at each end of which there are metal rods forming gratings $a\ a$. C D are boards standing on their edges, fastened to the top of box A. The board D is divided to interpose the trigger $j$ and its connections. That portion of the cover of box A between the guide-boards C D is made of two trap-doors E E', which are pivoted to the box-cover at $i\ i$. The under sides of the outer ends of doors E E' are provided with weights $d\ d$, which serve to close them suddenly by their gravity after the trap has been sprung and an animal has fallen into the box A. The ledges $e\ e$, connected with the ends of the box A, serve to prevent an animal within the box from escaping while the doors are opened to receive another animal. The trigger $j$ is hinged on a pivot-rod, between the short boards $g\ g$, forming an open box for the purpose. Connected with the rear portion of the box $h\ g\ g$, there is a pulley, $o$, over which cord $m$ runs, which connects the catch-spring $n$ with the upper end of trigger-board $j$. $k$ is the pivot of the trigger $j$. The spring $n$ is secured to the inner side of box A, as represented in the drawings, and serves to support the inner ends of trap-doors E E' until the trap is sprung. It will be seen that the horizontal portion of angular catch-spring $n$ passes freely through a slot in box A. The pendant P, fastened to the end of trap-door E', has secured to it a catch-spring like the spring $n$ for the purpose of supporting the door E, when door E' is closed with it. The spring $s$ will yield freely to allow door E to close after the other door has closed or shut. It will be understood that the trigger $j$ actuates the spring $n$ by the cord $m$, which withdrawal of spring-catch $n$ permits the weight of the animal upon the trap-doors to be dropped into the box A below, and the weights $d\ d$ cause the doors to immediately close, thereby setting the trap ready for another animal. The trap will be sprung by the animal's front feet, which will be necessarily placed upon the lower end of trigger $j$, when the attempt is made to reach the bait secured to the hook near the top of the trigger. The object of the guide-boards C D is to prevent the animal from catching hold of the top of the box A, when the trap is sprung to let it into the box A.

I have found, by frequent use, that my trap is a sure means of catching rats and mice.

Having fully described my invention, what I claim, and desire to secure by Letters Patent, is—

The combination of the weighted doors E E', pendant P, spring-catches $n\ s$, pulley and cord $m\ o$, trigger $j$, and ledges $e\ e$, arranged in relation to box A, guides C D, and the open trigger-box $g\ h$, in the manner sa and for the purpose described.

In testimony whereof, I have hereunto set my hand, this 5th day of October, 1867.

N. S. THOMPSON.

Witnesses:
   C. S. BARNET,
   H. P. K. PECK.